United States Patent [19]
Yamaguchi et al.

[11] Patent Number: 5,441,651
[45] Date of Patent: Aug. 15, 1995

[54] METHOD AND APPARATUS FOR PROCESSING SLUDGE

[75] Inventors: Mikimasa Yamaguchi, Yokusuka; Hiroshi Fukuzawa, Yokohama; Toshitaka Arai, Kamagaya, all of Japan

[73] Assignee: Fuji Electric Co., Ltd., Kawasaki, Japan

[21] Appl. No.: 178,058

[22] Filed: Jan. 6, 1994

[30] Foreign Application Priority Data

Jan. 7, 1993 [JP] Japan .................. 5-000867

[51] Int. Cl.⁶ .................................... B01D 24/28
[52] U.S. Cl. ........................ 210/780; 210/770; 210/350; 210/406; 210/459; 210/462; 210/321.75; 210/232; 210/486; 210/224
[58] Field of Search ............ 210/780, 770, 768, 350, 210/459, 295, 406, 462, 463, 486, 232, 321.75, 224

[56] References Cited

U.S. PATENT DOCUMENTS

| | | | |
|---|---|---|---|
| Re. 25,467 | 10/1963 | Logan et al. | 210/768 |
| 2,779,477 | 1/1957 | Swensen | 210/416.1 |
| 4,358,381 | 11/1982 | Takeuchi et al. | 210/173 |
| 5,192,456 | 3/1993 | Ishida et al. | 210/295 |

FOREIGN PATENT DOCUMENTS

60-59002 4/1985 Japan .
61-57043 12/1986 Japan .

*Primary Examiner*—Robert A. Dawson
*Assistant Examiner*—Ana M. Fortuna
*Attorney, Agent, or Firm*—Brumbaugh, Graves, Donohue & Raymond

[57] ABSTRACT

A method and apparatus for processing sludge, which utilizes filter plates and flow regulating means to form condensed sludge of higher concentration, have been developed. The filter plates are disposed within a sludge tank and noncondensed sludge is added to the sludge tank to completely cover the filter plates. Filtrate is then removed from the sludge tank by the filtrate extraction means via the permeable walls of the filter plates. As the filtrate passes through the permeable walls a first condensed sludge forms on the filter plates. After first condensed sludge is formed on the filter plates, a flow regulating means is operated to form second condensed sludge, an even higher concentrations of condensed sludge.

15 Claims, 11 Drawing Sheets

METHOD AND APPARATUS FOR PROCESSING SLUDGE

FIELD OF THE INVENTION

The present invention relates to a method and apparatus for filtering and condensing sludge in water purification plants and sewage treatment plants.

BACKGROUND OF THE INVENTION

Sludge filtering and condensing equipment is disclosed in Patent Publications 60-59002 and 61-57043. The prior art filtering and condensing equipment described therein has filter plates arranged in a sludge tank, wherein one end of a filtrate discharge pipe is connected to the filter plate, and the other end is drawn out of the sludge tank. When the sludge tank is filled with sludge, sludge particles accumulate on the filter plate due to gravitational forces or by vacuum pressure acting on the inside of the filtrate discharge pipe. The water contained in the sludge passes into the filter plate, and is drawn from the sludge tank through the filtrate discharge pipe.

In particular, Patent Publication No. 60-59002 discloses sludge filtering and condensing equipment capable of forming uniformly thick cakes, wherein permeable filter plates having filter cloths affixed on both sides of the plates, are immersed in a tank containing a non-condensed sludge solution, and a filtrate discharging means is provided on said filter plates.

Additionally, Patent Publication No. 61-57043 discloses filtering and condensing equipment, in which water absorbing filter plates are disposed in a filtering and condensing tank, wherein one end of a filtrate discharge pipe is connected to the filter plate, while the other end is connected to a siphon tube disposed externally to the filtering and condensing equipment. The filtrate is siphoned from the top of the filter plate thereby forming uniformly thick cakes on the filter plate.

After condensed sludge has formed on the filter plates, the noncondensed sludge is removed from the tank and the condensed sludge is separated from the filter plate by blowing compressed air into the filter plate through, for example, the filtrate discharge pipe. Then, the separated condensed sludge falls to bottom of the sludge tank, and is removed from the tank.

The prior art achieves a higher concentration of condensed sludge by increasing both the vacuum pressure and the filtering period. Vacuum pressure is raised by extending the length of the filtrate discharge pipe downward outside of the sludge tank. For example, a negative pressure of 200 mmHg can be obtained when the exterior portion of the filtrate discharge pipe is 2.7 m in length, while increasing the length to 9.5 m will obtain a negative pressure of 700 mmHg.

By way of example, filtering purified water sludge with a solid concentration of 4% for 40 minutes with a vacuum pressure of 200 mmHg results in a condensed sludge with a solid concentration of 10%. Increasing the filtering time to 100 minutes produces a concentration of 11.2%.

Filtering purified water sludge with a solid concentration of 4% for 40 minutes with a negative pressure set to 700 mmHg results in a condensed sludge with solid concentration of 13.6%. Increasing the filtering period to 100 minutes produces condensed sludge with a solid concentration of 14.5%.

SUMMARY OF THE INVENTION

As apparent from the above discussion, prolonging the filtering period does not greatly increase the sludge concentration levels. The inventors of the present invention have investigated the causes thereof, and have discovered the following facts. During filtration, sludge particles deposit on the filter cloths of the filter plate and form layers which continuously increase in thickness. As the sludge layers becomes thicker, it becomes increasingly more difficult to draw the filtrate through the plates. The filtrate, following the path of least resistance, is extracted from the tank via those portions of the plate where no deposition layers have formed. Therefore, while the thickness of the deposition layers continues to increase gradually, prolonging the filtration time or raising the vacuum pressure will not produce the desired condensed sludge concentrations.

The object of the present invention is to provide for a method and apparatus for filtering and condensing sludge so that highly-concentrated sludge can be obtained without utilizing increased vacuum pressures or filtration periods.

The present invention overcomes the prior art limitations by including a flow regulator in the sludge tank. The inventive methodology calls for processing sludge in a sludge tank through utilization of a flow regulating means and one or more filter plates. The processing technique includes drawing filtrate through the filter plates to form a first condensed sludge and then operating the flow regulating means to regulate the flow of non-condensed sludge inside the sludge tank. Additional filtrate is then drawn from the first condensed sludge formed on the filter plates to form second sludge which is more condensed than the first condensed sludge.

PREFERRED EMBODIMENTS OF THE INVENTION

Explanations of the embodiments of the method and apparatus for processing sludge are provided hereunder with reference to the appended drawings.

Figure 1:
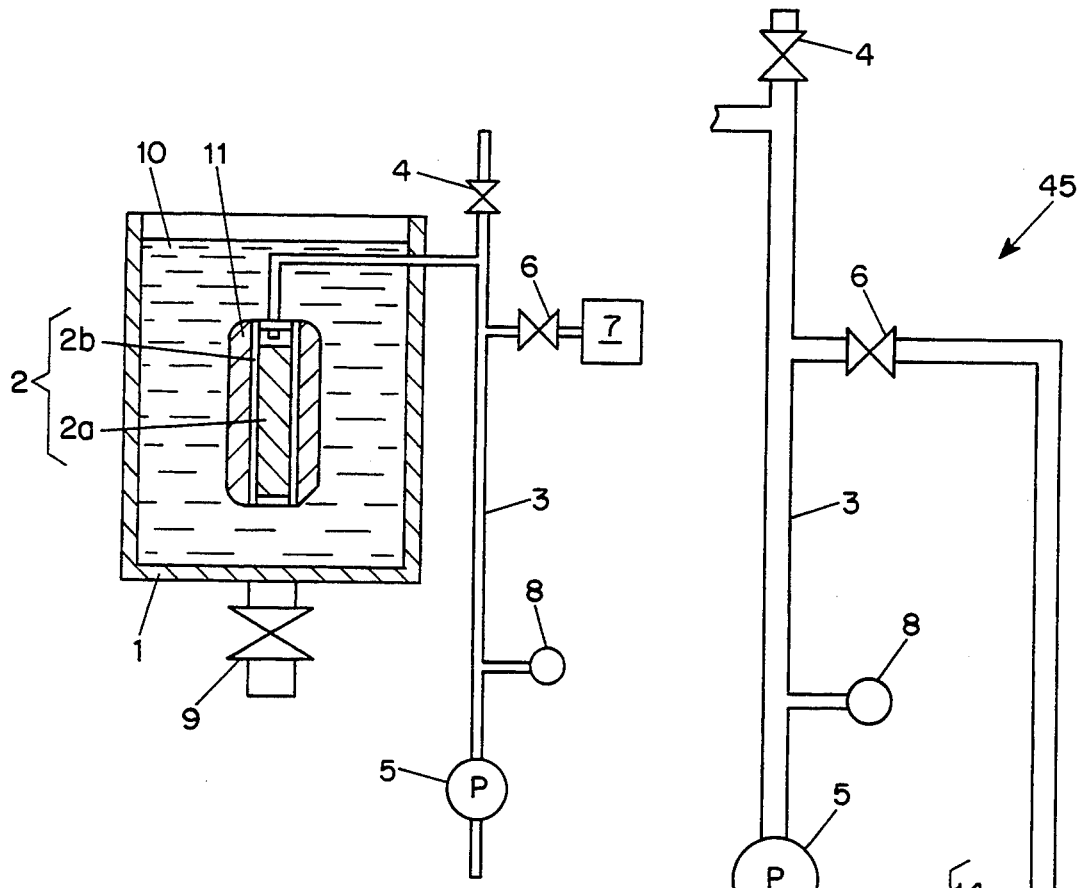
FIG. 1 illustrates a cross-section of a sludge processor according to the invention.

FIG. 1 shows a cross-section of a sludge processor according to the present invention. For the sake of simplicity, only one filter plate is shown in the figure. The diagram depicts a first condensed sludge formed on the filter plates, while noncondensed sludge retains its fluidity within the sludge tank.

In FIG. 1, a filter plate 2 including a liquid-permeating plate 2a, and a filter cloth 2b which seals the outer surface of the liquid-permeating plate 2a, is disposed at the center of a sludge tank 1, wherein a filtrate discharge pipe 3, with one end connected to the upper edge of the filter plate 2, is drawn outside the sludge tank 1. The filtrate discharge pipe 3 exits the sludge tank 1 and branches out vertically toward the floor, with one extension connected to an air release valve 4, and the other extension continuing past the bottom of the sludge tank 1 and connecting to a filtrate discharge pump 5. A filtrate supply tank 7 connected to a gate valve 6 and a vacuum indicator 8 are disposed between the air release valve 4 and the filtrate discharge pump 5. A condensed sludge discharge valve 9 is connected to the bottom of the sludge tank 1.

The operation of the filtering and condensing equipment will be explained below. First, noncondensed sludge 10 is supplied into the sludge tank 1 up to a level above the filter plate 2. Next, the air release valve 4 and a gate valve 6 are opened, and the filtrate discharge valve 3 is filled with filtrate provided by the filtrate supply tank 7. Then, the air remaining in the filtrate discharge pipe 3 is discharged from the filtrate extraction means 45 through the air release valve 4. Then, the air release valve 4 is closed, and the filtrate discharge pump 5 is operated.

Once the pressure, as indicated by the vacuum indicator 8, within the filtrate discharge pipe 3 reaches a predetermined value, the gate valve 6 is closed. These operations enable the filtrate discharge pipe 3 to create a vacuum which operates within the filter plate 2, causing the filtrate contained in the noncondensed sludge 10 to contact the filter cloth 2b, be absorbed inside the filter plate 2 and be discharged via the filtrate extraction means 45. Meanwhile, the particles in the noncondensed sludge 10 are collected and deposited on the filter cloth 2b.

The vacuum pressure in the filtrate discharge pump is monitored by the vacuum indicator 8, so that the supply of filtrate from the filtrate tank 13 is stopped once the vacuum pressure reaches 200 mmHg. At that point the filtrate discharge pump 5 operates to increase vacuum pressure operating inside the filter plate 2. This vacuum pressure can reach a maximum of 700 mmHg.

Once sufficient levels of first condensed sludge have been achieved, the filtrate discharge pump 5 is stopped, and the noncondensed sludge 10 is removed from the sludge tank 1. Then, the air release valve 4 is opened, enabling air to be blown back into the tank through the first end of the filtrate discharge pipe 3 disposed within the sludge tank 1. Blowing air back into the sludge tank displaces the first condensed sludge 11 from the filter plate 2. The first condensed sludge 11 can then be removed from the sludge tank 1 via the condensed sludge removal valve 9.

Figure 2:
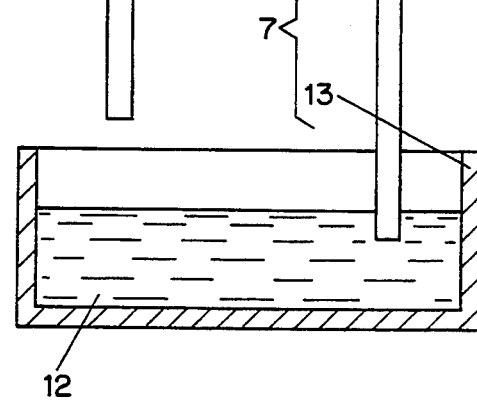
FIG. 2 illustrates a cross-section of a first exemplary filtrate extractor used with the processor of FIG. 1.

FIG. 2 shows a first embodiment of the filtrate extractor 45 used with the processor of FIG. 1. The filtrate extractor 45 in this embodiment consists of a filtrate discharge pipe 3, a filtrate discharge pump 5, a gate valve 6, a filtrate tank 13 and a suction pipe 14 which extends below the filtrate discharge pipe 3 and reaches inside the filtrate tank 13.

In operation, the filtrate tank 13 is filled with filtrate. Then the gate valve 6 is opened so that filtrate may be supplied to the filtrate discharge pipe 3 via the suction pipe 14. Filtrate extracted from the noncondensed sludge 10 returns to the filtrate tank 13 via the filtrate discharge pipe 3.

Figure 3:
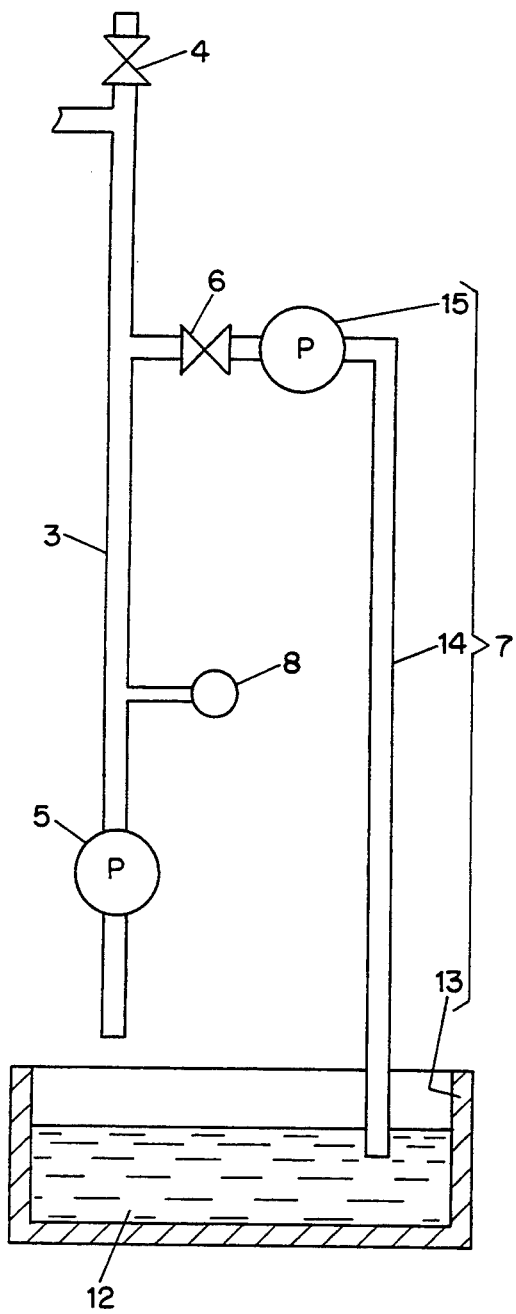
FIG. 3 illustrates a cross-section of a second exemplary filtrate extractor used with the processor of FIG. 1.

FIG. 3 shows a second embodiment of the filtrate extractor 45 used with the processor of FIG. 1. A filtrate feed pump 15 is disposed along the suction pipe 14 to assure a more reliable filtrate supply into the filtrate discharge pipe 3.

Figure 4:
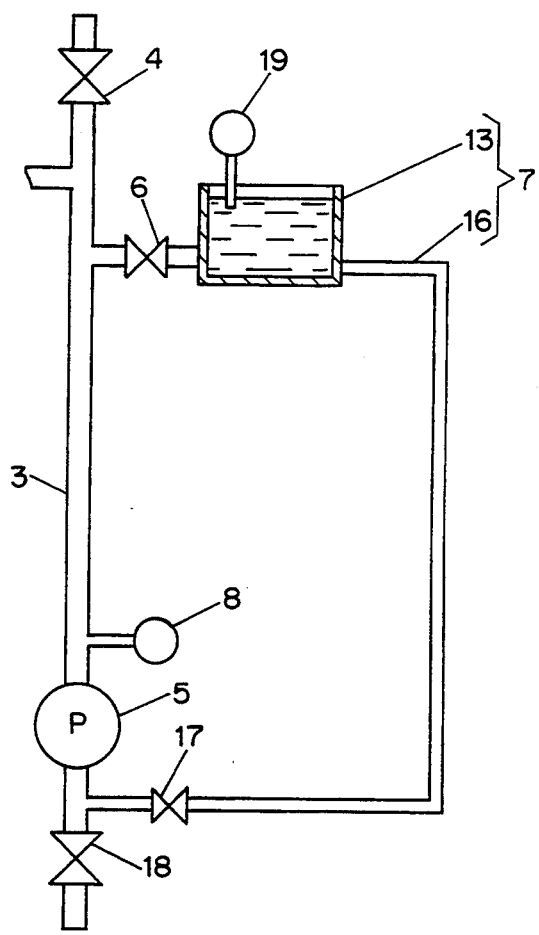
FIG. 4 illustrates a cross-section of a third exemplary filtrate extractor used the processor of FIG. 1.

FIG. 4 shows a third embodiment of the filtrate extractor 45 used with the processor of FIG. 1. A filtrate tank 13 is disposed between the gate valve 6, and connecting pipe 16. A water level gauge 19 is disposed in the filtrate tank 13. Thus, the filtrate tank 13 is placed at a considerably higher position relative to the filtrate discharge pipe 3 than in the embodiments displayed in FIGS. 2 and 3. The connecting pipe 16 is attached to gate valve 17, which is disposed below the filtrate discharge pump 5. The filtrate discharge pump is disposed above gate valve 18 and below air valve 4 along the filtrate discharge pipe 3.

During operation of the filtrate extraction means 45, the air release valve 4 and the gate valve 6 are opened to feed filtrate into the filtrate discharge pipe 3. Next, the air release valve 4 is closed, and the filtrate discharge pump 5 is operated. Then, the gate valve 17 is closed and the gate valve 18 is opened. After sufficient vacuum pressure is established, the gate valve 6 and the gate valve 18 are closed, while the gate valve 17 is opened thereby feeding filtrate 12 into the filtrate tank 13. The filtrate level gauge 19 monitors the level of filtrate 12 within the filtrate tank 13.

Figure 5:
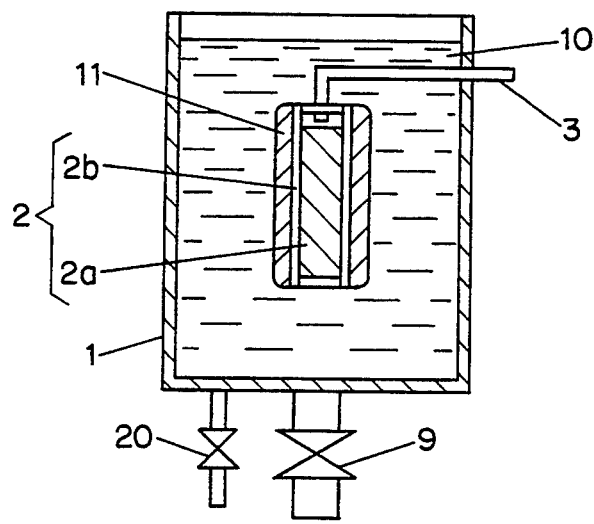
FIG. 5 illustrates a cross-section of the processor of FIG. 1 with an additional noncondensed sludge discharge valve used as a flow regulator.

FIG. 5 shows the processor of FIG. 1 with an additional noncondensed sludge discharge valve 20 used as a flow regulator. The various embodiments of the flow regulator enable the sludge processor to form second condensed sludge, a sludge with a higher concentration than first condensed sludge.

The noncondensed sludge discharge valve 20 enables the noncondensed sludge 10 to be discharged from the sludge tank 1 after formation of the first condensed sludge 11. The noncondensed sludge discharge valve 20 is opened and the noncondensed sludge 10 is removed from the sludge tank 1, thereby enabling the first condensed sludge 11 formed on the filter plate 2 in the sludge tank 1 to contact the air. As a result, only the first condensed sludge 11 attached to the filter plate 2 may undergo additional filtration to form second condensed sludge.

Figure 6:
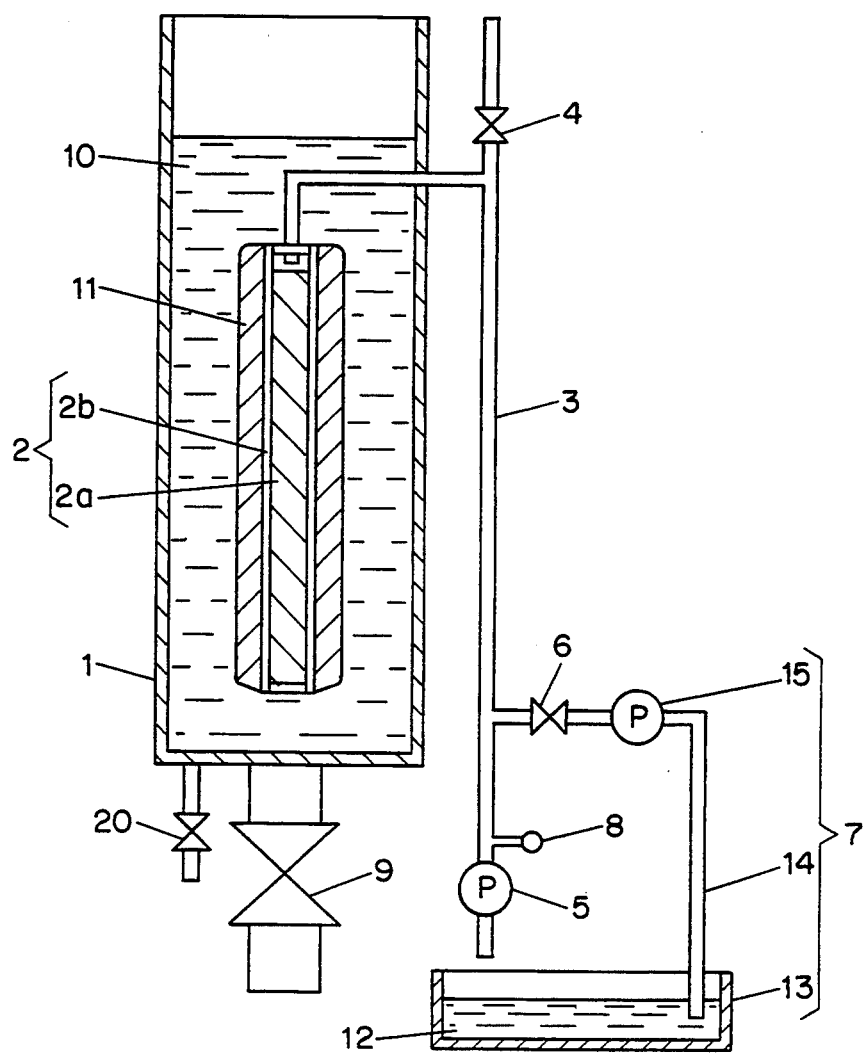
FIG. 6 illustrates a cross-section of the processor of FIG. 5 with an additional filtrate extractor.

FIG. 6 shows the processor of FIG. 5 with the filtrate extractor added. First condensed sludge 11 forms on the filter cloth 2b, while noncondensed sludge 10 retains its fluidity within the sludge tank 1.

Figure 7:
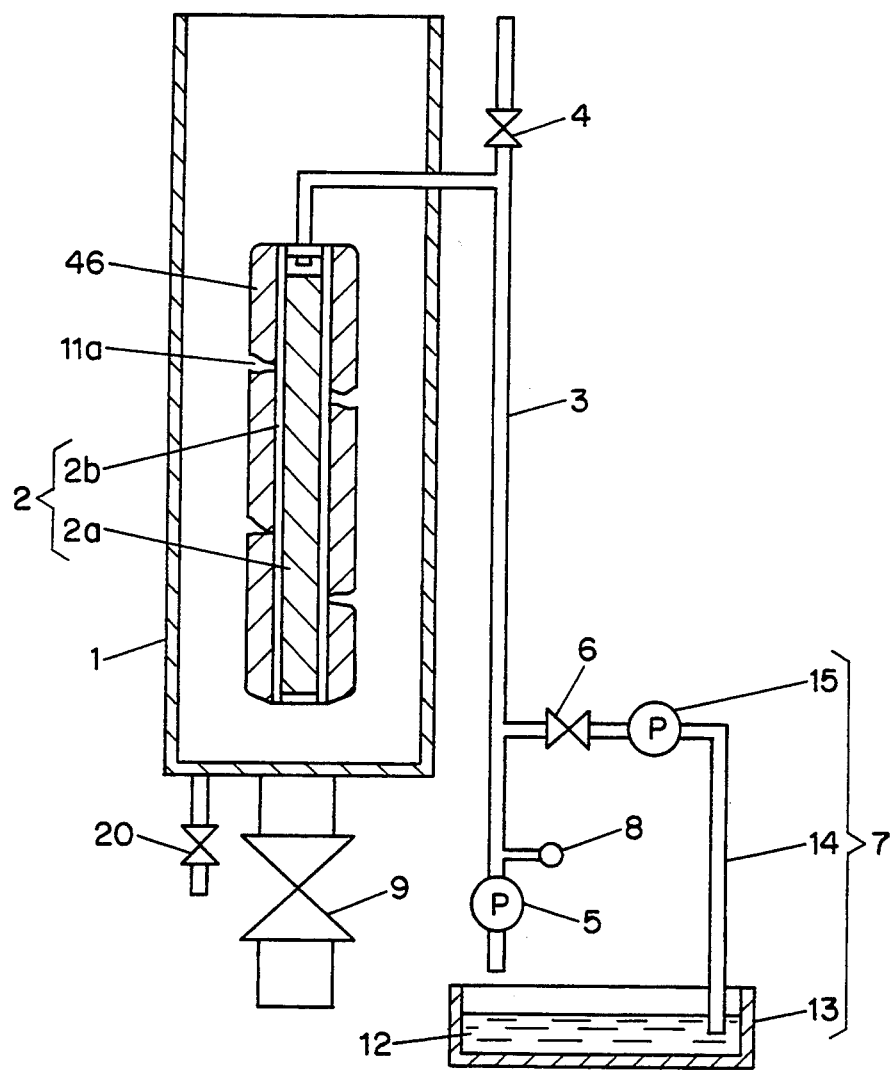
FIG. 7 illustrates a cross-section of the processor of FIG. 6 wherein cracks are formed in highly condensed sludge on filter plates.

FIG. 7 shows the processor of FIG. 6 when cracks have formed in the second condensed sludge 46 formed on the filter plates. After the first condensed sludge has formed on the filter plates 2, the noncondensed sludge removal valve 20 is opened to remove noncondensed sludge 10 from the sludge tank 1. As a result, only the first condensed sludge 11 deposited on the filter plates 2, may be further filtered. The figure further shows a state in which the second condensed sludge has been formed; this occurs when cracks 11a develop in the condensed sludge formed on the filter plates 2.

In an exemplary process incorporating the above technique, sludge with a solid component of 4% was filtered for 30 minutes utilizing a vacuum pressure of 700 mmHg. Then, the noncondensed sludge 10 was removed from the sludge tank, exposing the first condensed sludge 11 to air. The vacuum pressure began to drop slowly after 34 minutes, and fell below 300 mmHg after 40 minutes. At the end of this process the solid component in the second condensed sludge was 20.4%. The present invention enables formation of sludge with a higher concentration than that obtained by conventional methods without increasing the vacuum pressure utilized or the filtration time period.

Figure 8:
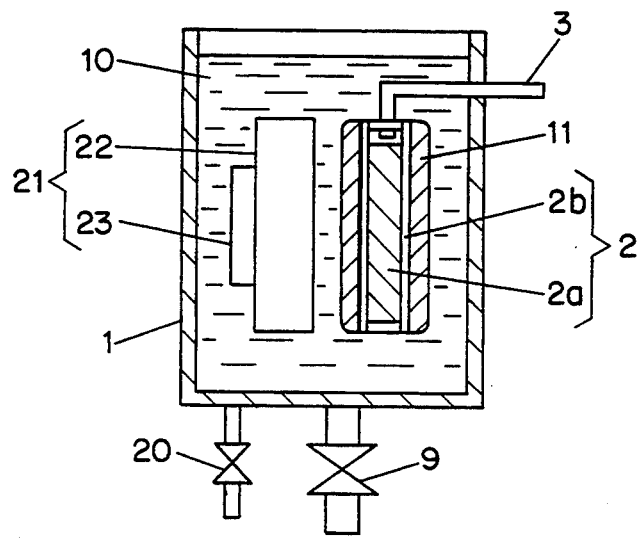
FIG. 8 illustrates a cross-section of the equipment of FIG. 5 with an additional noncondensed sludge extractor used as a flow regulator.

FIG. 8 shows a noncondensed sludge extractor means 21 used for regulating the flow of noncondensed sludge 10 in the sludge tank 1. The noncondensed sludge extractor means 21 comprises a press 22, which acts as a flow regulator, and a driving device 23. The press 22 works with a filter plate 2 to compact the first condensed sludge 11 formed on the filter plate 2.

Specifically, the driving device 23 moves the removing body 22 toward the filter plates 2 to force the noncondensed sludge 10 located near the filter plates 2 away from the first condensed sludge 11, and to compact the first condensed sludge 11.

The presence of noncondensed sludge 10 in the sludge tank 1 serves a useful purpose. In particular, the noncondensed sludge 10 surrounding the filter plates 2 prevents air from entering the filter plates 2 after cracks 11a develop in the first condensed sludge 11. As a result, when cracks develop the vacuum pressure inside the filter plates 2 does not drop, thereby allowing formation of a higher-concentration, second condensed sludge. Once filtration is complete, the press 22 is moved away from the filter plates 2 to allow the second condensed sludge 46 to be discharged.

In an exemplary process incorporating the above technique, sludge with a solid component of 4% was filtered with a vacuum pressure of 700 mmHg for 30 minutes. Then the removing body 22 acted in concert with the filter plates 2 to compress the first condensed sludge 11, and filtering of the first condensed sludge continued for an additional 40 minutes at a vacuum pressure of 700 mmHg. Upon completion of filtration, the noncondensed sludge removal valve 20 was opened to remove noncondensed sludge 10 from the sludge tank 1, and the removing body 22 was moved away from the filter plate 2. Then, the second condensed sludge 46 formed on the filter plates 2 was removed from the sludge tank 1. This second condensed sludge had a solid component of 30.1%.

Figure 9:
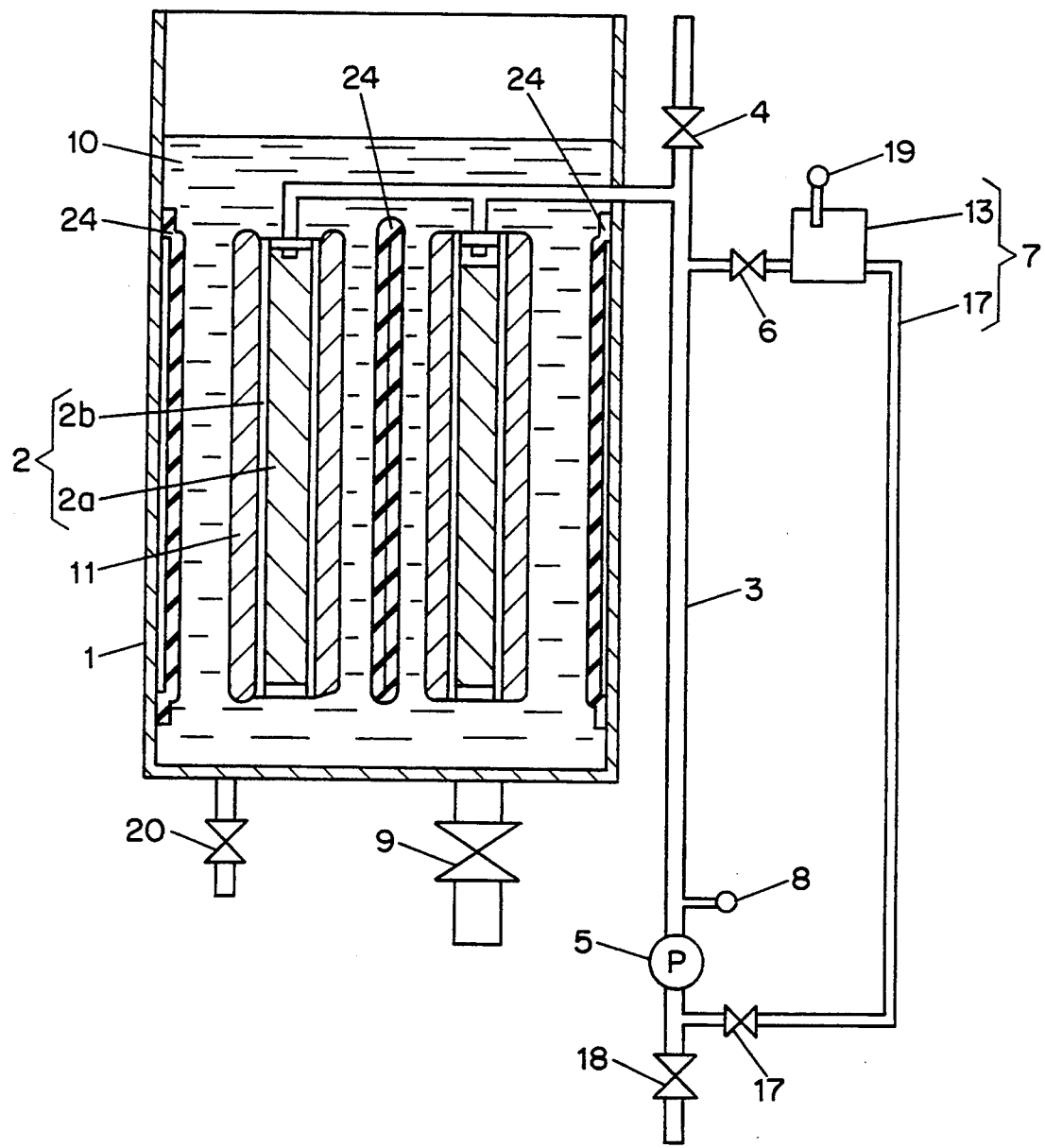
FIG. 9 illustrates a cross-section of a second sludge processor with multiple filter plates, and rubber diaphragms used as the flow regulator.

FIG. 9 shows a second sludge processor with multiple filter plates 2 with rubber diaphragms 24 utilized as the flow regulator. Rubber diaphragms 24 are disposed within the sludge tank 1 so that when inflated the rubber diaphragms work with the filter plates 2 to compact the first condensed sludge 11. The rubber diaphragms 24 are connected to a device, not shown, capable of supplying and discharging pressurized air.

When an appropriately thick layer of first condensed sludge 11 has formed on the filter plates 2, pressurized air is supplied into the rubber diaphragms 24 to inflate them, and the surfaces of the rubber diaphragms 24 act in concert with the filter plates 2 to compact the first condensed sludge 11. Thereafter, additional filtration of the first condensed sludge occurs to form second condensed sludge.

Figure 10:
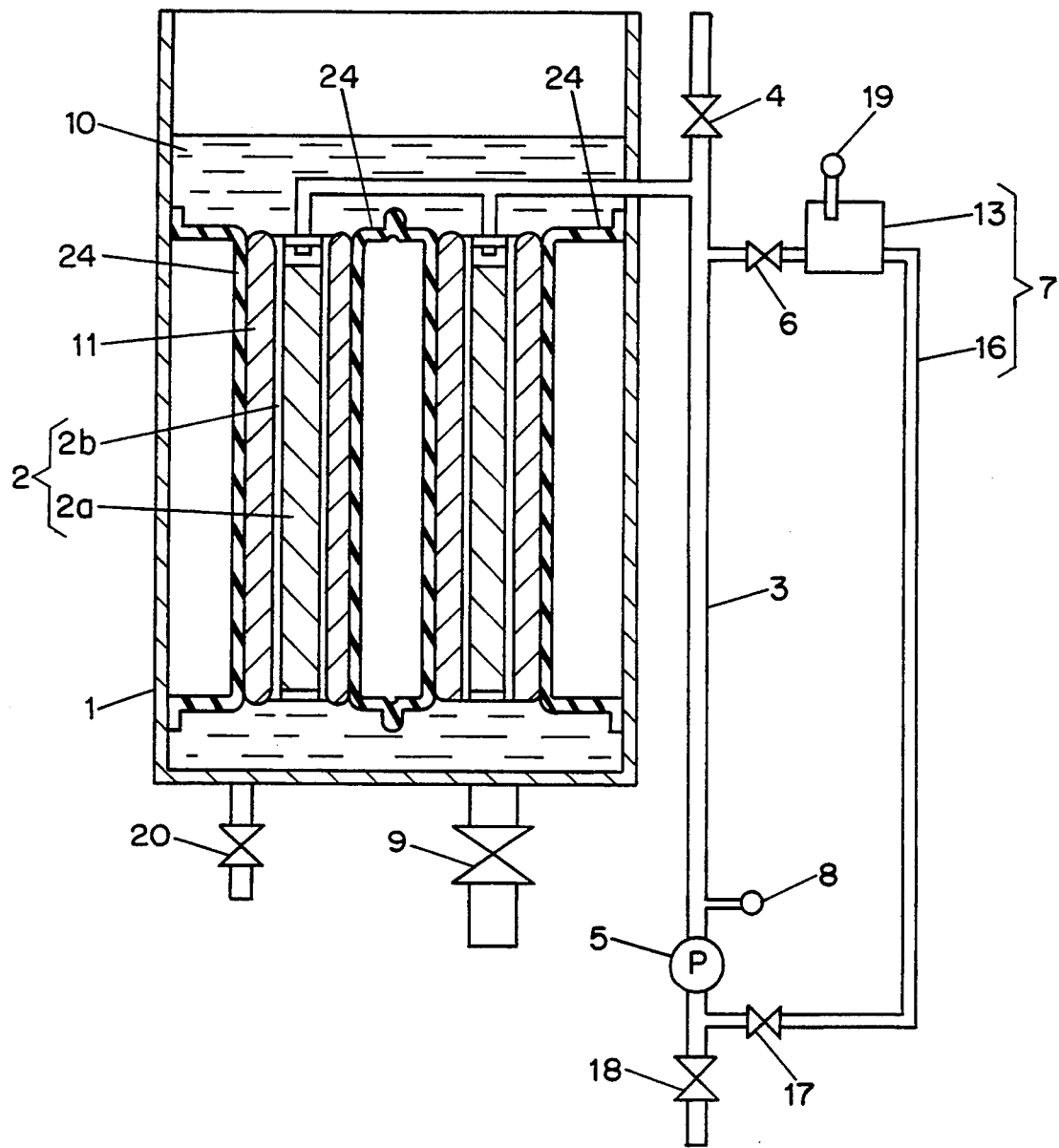
FIG. 10 provides another view of FIG. 9 with the rubber diaphragms inflated.

FIG. 10 shows another view of FIG. 9 with the rubber diaphragms 24 inflated. The surfaces of the diaphragms 24 contact the first condensed sludge 11 thereby forcing the noncondensed sludge 10 away from the filter plates 2 and creating a condition wherein only the first condensed sludge 11 previously formed on the filter plates 2 may be further filtered.

Figure 11:
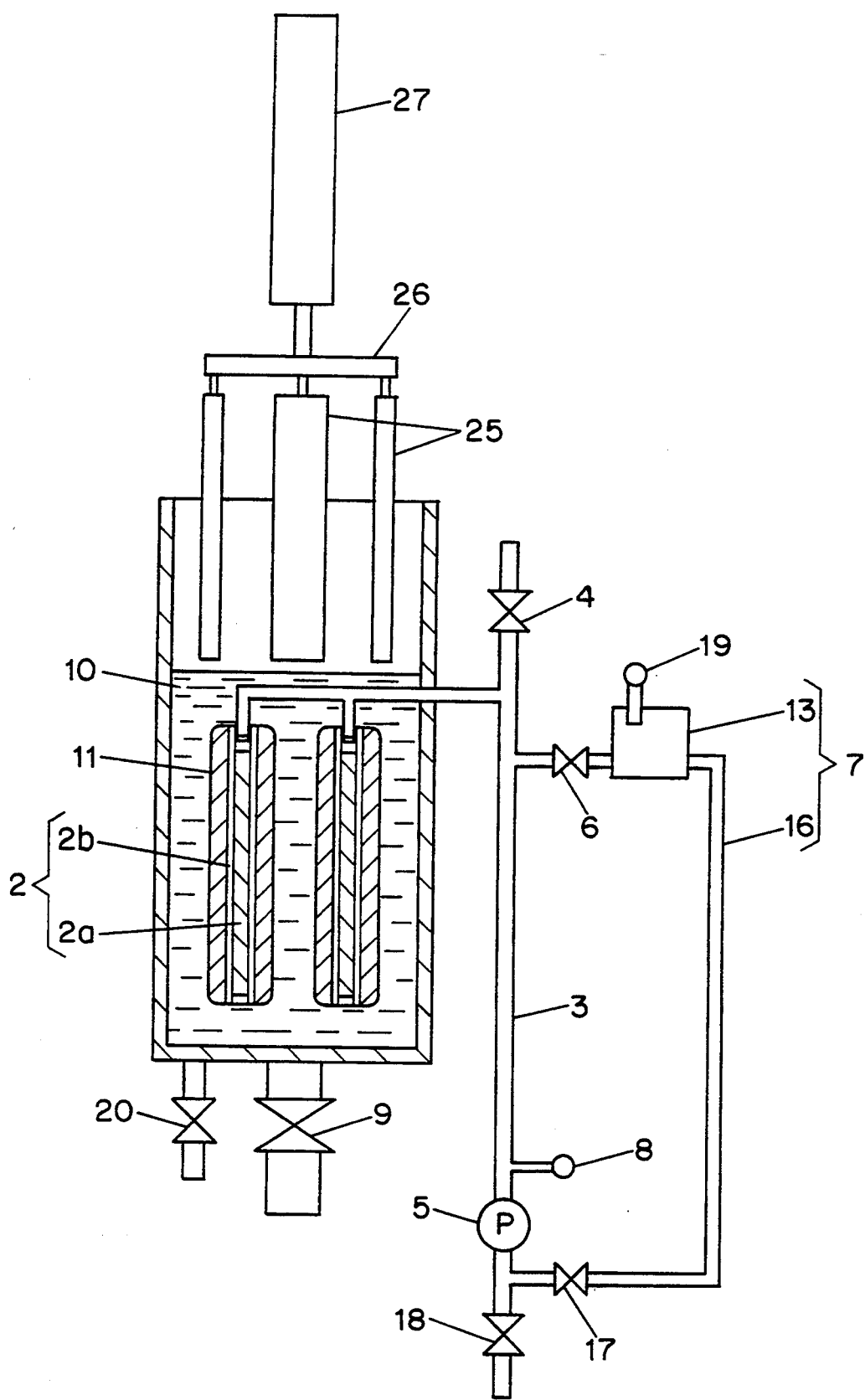
FIG. 11 illustrates a cross-section of a third sludge processor with multiple filter plates and parallel plates to fit therebetween.

FIG. 11 shows a third sludge processor with multiple filter plates and parallel plates to fit therebetween. The parallel plates 25 are generally parallel to the filter plates 2, and are substantially perpendicular to a supporting plate 26. The supporting plate 26, is connected to an exterior air cylinder 27.

After first condensed sludge 11 is formed on the filter plates 2, the exterior air cylinder 27 is operated to lower the parallel plates 25 into the sludge tank 1 to position the parallel plates 25 closely to the filter plates 2. At this point, the parallel plates 25 act in concert with the filter plates 2 to compact the first condensed sludge 11 formed on the filter plates 2. The surface area of the parallel plates 25 completely encompasses the surface area of the filter plates 2, therefore only the first condensed sludge 11 formed on the filter plates 2 is further filtered and condensed.

Figure 12:
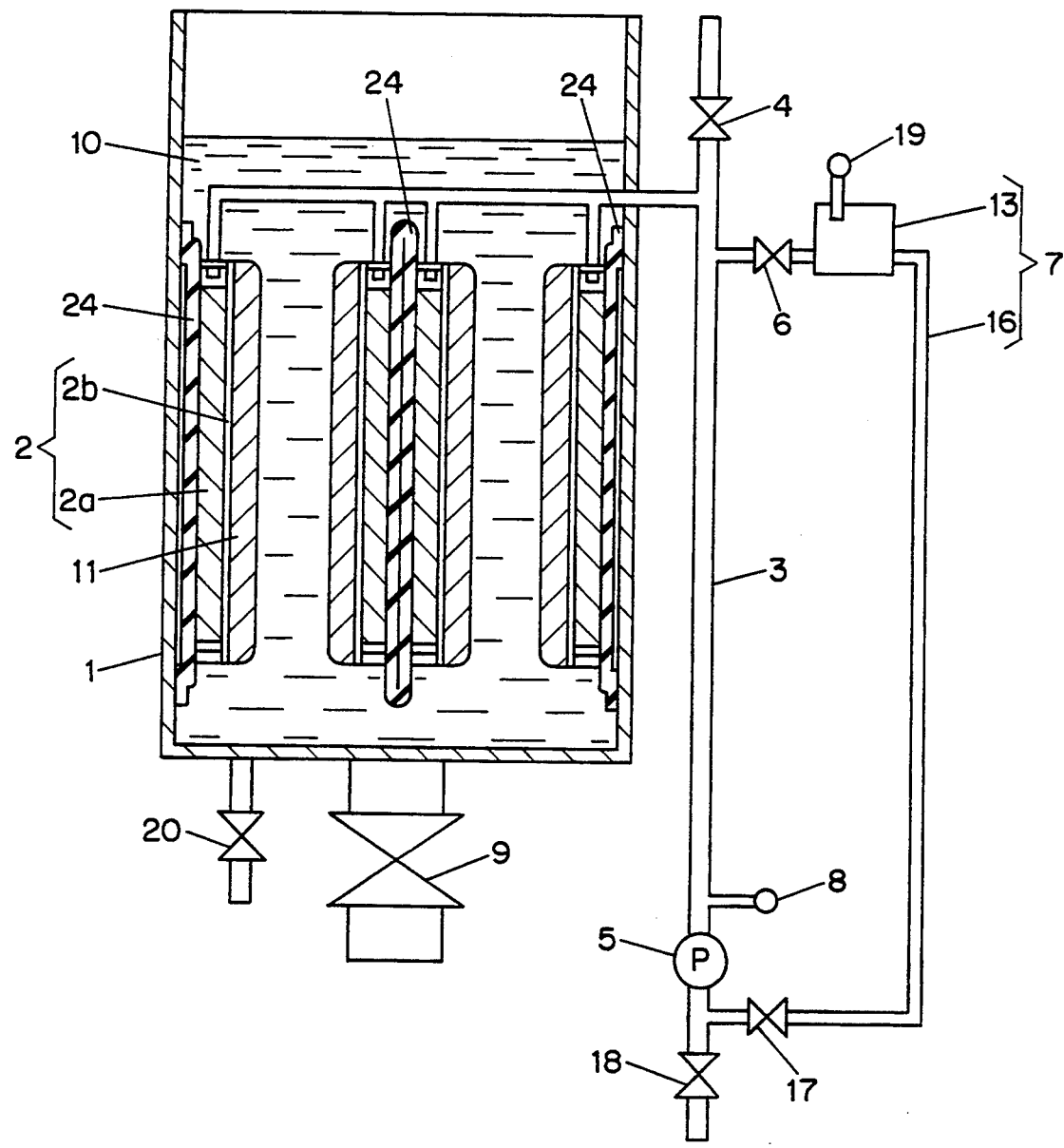
FIG. 12 illustrates a cross-section of a fourth sludge processor with multiple filter plates and rubber diaphragms inserted therein.

FIG. 12 illustrates a fourth sludge processor with multiple filter plates and rubber diaphragms inserted therein. The filter plates 2 and rubber diaphragms 24 are arranged so that when the rubber diaphragms 24 are inflated, the filter plates 2 are forced toward one another. As a result, the first condensed sludge 11 formed on the filter plates 2 is compacted, and further filtration of the condensed sludge occurs to form second condensed sludge 46.

Figure 13:
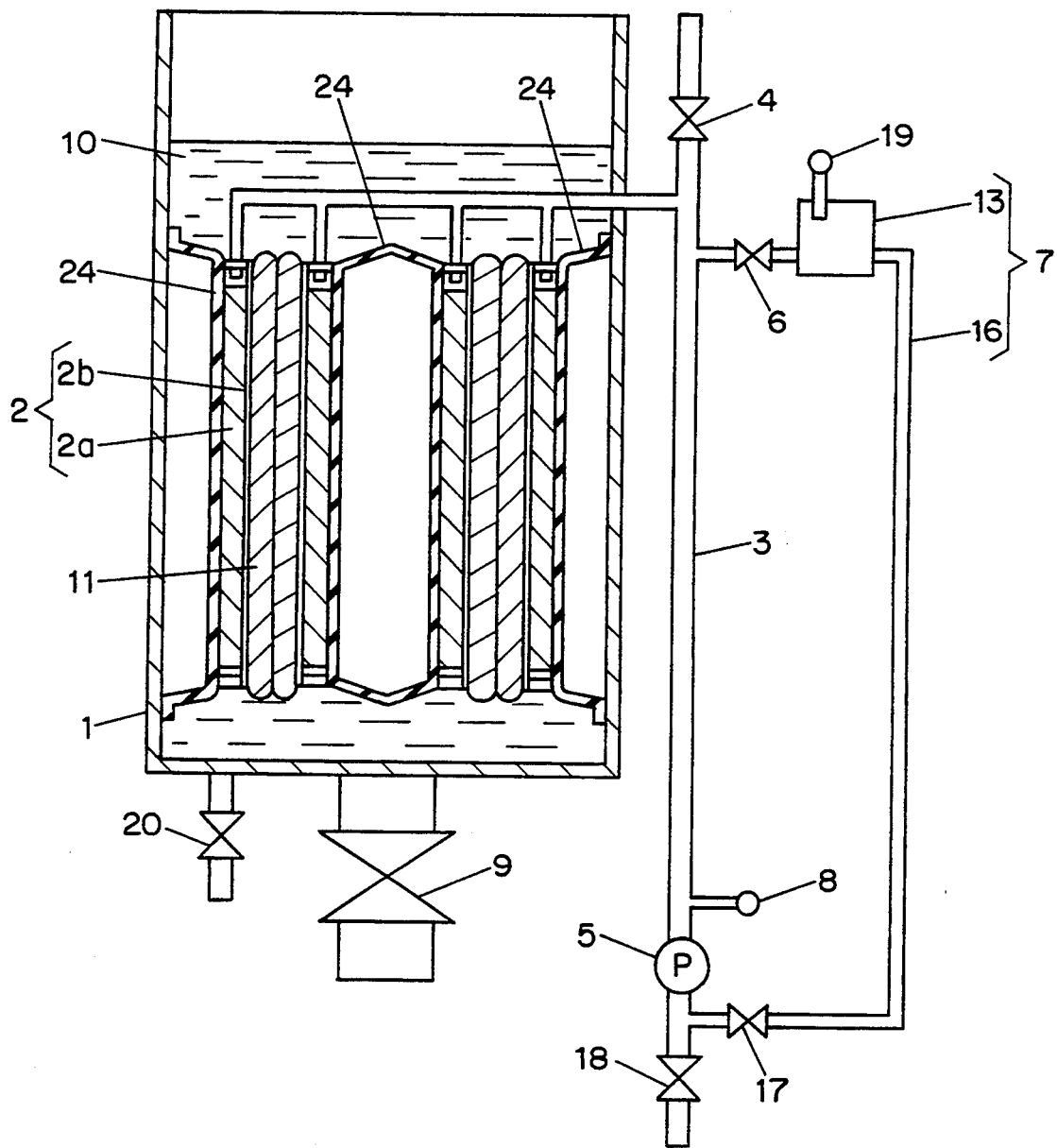
FIG. 13 provides another view of FIG. 12 with the rubber diaphragms inflated.

FIG. 13 provides another view of FIG. 12 with the rubber diaphragms 24 inflated. Pressurized air is blown into the rubber diaphragms 2, to inflate the diaphragms and force the filter plates 24 together. The noncondensed sludge 10 near the filter plates 24 is forced off the surface of the filter plates 2 as the first condensed sludge surfaces 11 engage one another, and the first condensed sludge 11 is compacted before further filtering.

Figure 14:
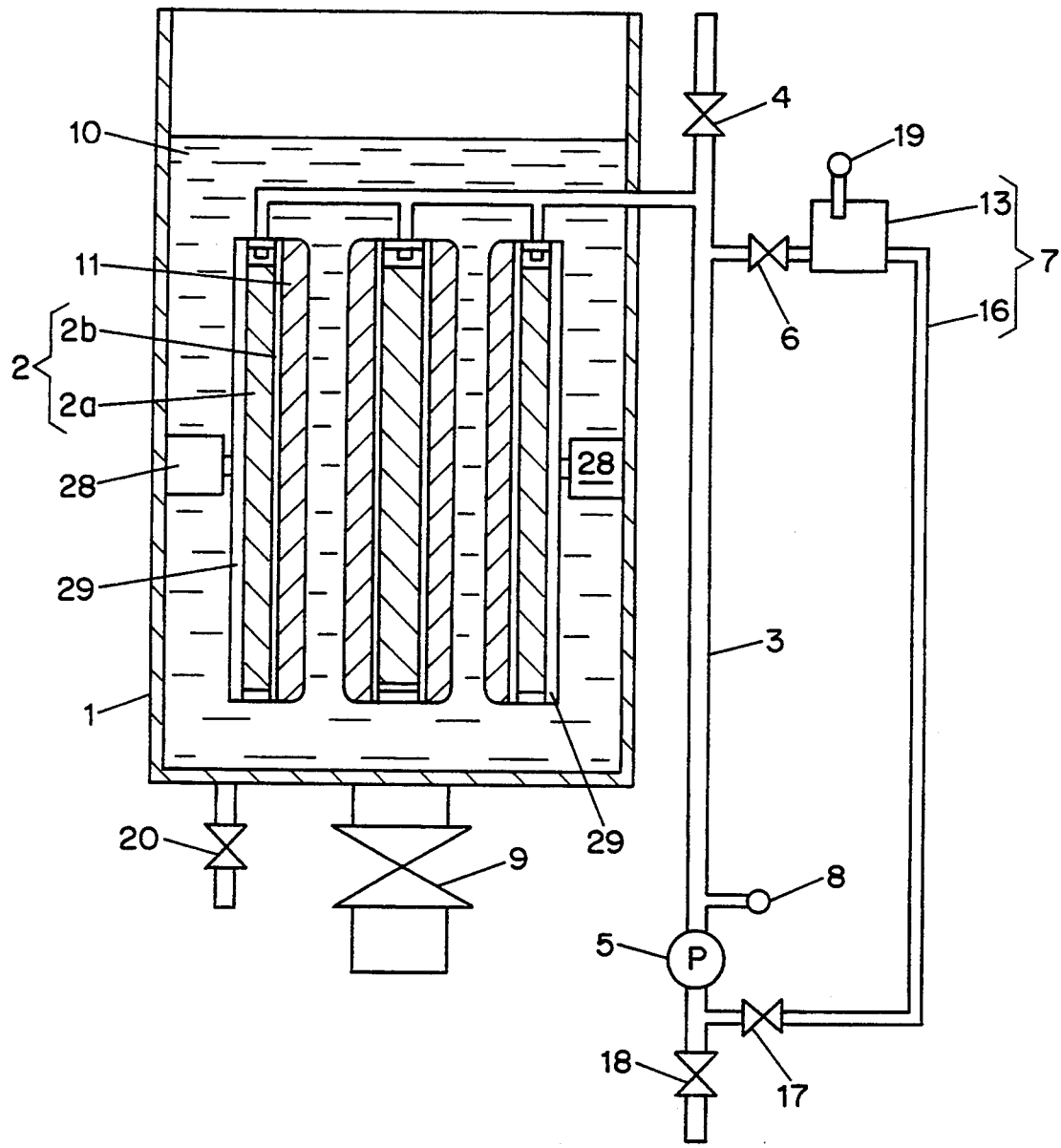
FIG. 14 illustrates a cross-section of a fifth sludge processor with multiple filter plates and interior air cylinders for compressing filter plates together.

FIG. 14 shows a fifth sludge processor. Two interior air cylinders 28, each disposed on opposite, interior vertical walls of the sludge tank 1, are connected to filter plates 2 via supporting plates 29. When the interior air cylinders 28 are activated, the first condensed sludge 11 is compacted, and further filtered to form second condensed sludge.

Figure 15:
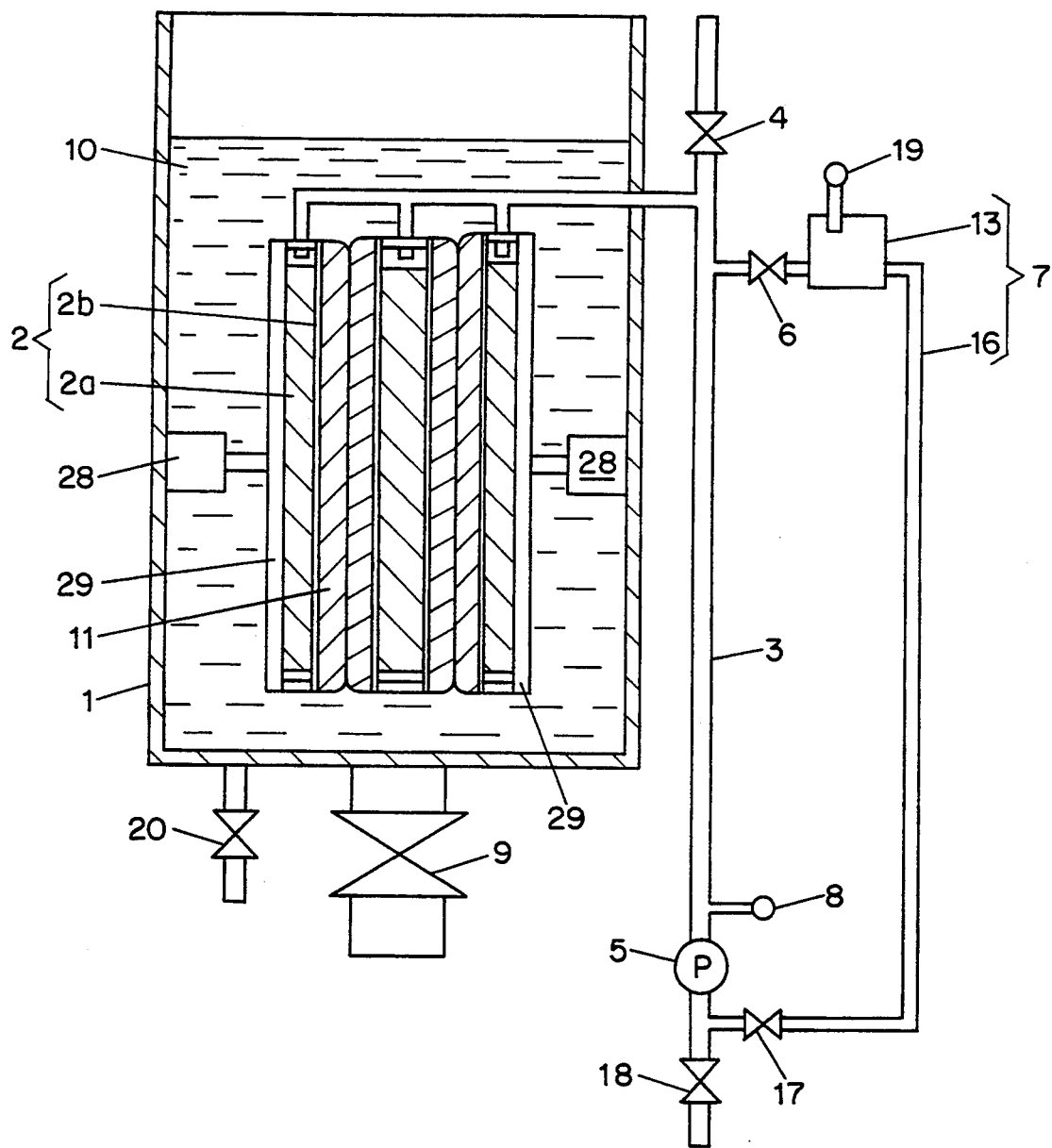
FIG. 15 provides another view of FIG. 14 with the interior air cylinders activated to compress filter plates together.

FIG. 15 depicts another view of FIG. 14 with the interior air cylinders activated to compact the first condensed sludge 11.

The method and apparatus for processing sludge described above is superior to the prior art because it enables production of highly condensed sludge without utilizing prolonged filtration periods or high vacuum pressures. Additionally, the present invention describes a methodology whereby the noncondensed sludge is removed from the sludge tank so that only condensed sludge is filtered to higher concentrations. Finally, the present invention describes a methodology whereby the filter plates are brought together so that the condensed sludge formed on the filter plates compacts against the condensed sludge formed on an opposite filter plate, thereby providing a condition where additional filtration as regards the condensed sludge is possible.

The foregoing merely illustrates the principles of the invention. It will thus be appreciated that those skilled in the art will be able to devise numerous arrangements which, although not explicitly shown or described herein, embody the principles of the invention and are thus within its spirit and scope.

We claim:

1. A method for processing sludge in a sludge tank comprising flow regulating means disposed within said tank and one or more filter plates disposed within said tank, said method comprising the steps of:
   processing non-condensed sludge to form first condensed sludge, said processing step comprising the step of drawing filtrate from said non-condensed sludge through said one or more filter plates, and the step of operating said flow regulating means to regulate the flow of said non-condensed sludge in close proximity to said filter plates within said sludge tank; and
   drawing additional filtrate from the first condensed sludge formed on said one or more filter plates to form second condensed sludge which is more condensed than the first condensed sludge.

2. The method of claim 1, wherein said operating step further comprises the step of removing from said sludge tank said non-condensed sludge to expose to the air said first condensed sludge formed on said one or more filter plates.

3. The method of claim 1, wherein said flow regulating means comprises one or more press apparatus disposed within said tank adjacent to said at least one or more filter plates and said operating step comprises the step of moving said at least one press apparatus toward said one or more filter plates to compact said first condensed sludge formed on said filter plates;
   whereby said noncondensed sludge located near said filter plates is forced away from said first condensed sludge so that only said first condensed sludge can be further filtered.

4. The method of claim 1, wherein said flow regulating means comprises one or more rubber diaphragms disposed within said sludge tank and said operating step further comprises the step of inflating said one or more rubber diaphragms.

5. The method of claim 1, wherein said flow regulating means comprises parallel plates and said operating step comprises the step of lowering said parallel plates into said sludge tank to be positioned closely to said one or more filter plates.

6. The method of claim 1, wherein said flow regulating means comprises one or more rubber diaphragms disposed within said sludge tank and said operating step further comprises the step of inflating said one or more rubber diaphragms to force said one or more filter plates together to compact said first condensed sludge formed on said filter plates.

7. The method of claim 1, wherein said flow regulating means comprises one or more air cylinders disposed within said sludge tank and said operating step further comprises the step of activating said cylinders to compact said first condensed sludge formed on said one or more filter plates.

8. Apparatus for processing sludge in a sludge tank comprising:
   means for regulating a flow of noncondensed sludge disposed within said tank;
   one or more filter plates disposed within said tank;
   means for processing said noncondensed sludge to form first condensed sludge, said processing means comprising means for drawing filtrate from said noncondensed sludge through said one or more filter plates, and means for operating said flow regulator means to regulate the flow of said noncondensed sludge in close proximity to said filter plates;
   said drawing means including means for drawing additional filtrate from said first condensed sludge formed on said one or more filter plates to form second condensed sludge which is more condensed than said first condensed sludge; and
   means for discharging said second condensed sludge.

9. The apparatus of claim 8 wherein said filtrate drawing means comprises:
   a filtrate discharge pipe for removing filtrate from said sludge tank;
   a gate valve for regulating the flow of filtrate into said filtrate discharge pipe;
   an air release valve which acts in concert with said filtrate discharge pipe to allow creation of vacuum pressure within said filtrate drawing means;
   a suction pipe which provides an initial supply of filtrate to enable creation of said vacuum pressure;
   a filtrate supply tank to collect filtrate drawn from said sludge tank;
   a filtrate discharge pump to create vacuum pressure within said filtrate discharge pipe, thereby allowing said filtrate to be removed from said sludge tank; and
   a vacuum gauge to measure vacuum pressure within said filtrate discharge pipe.

10. The apparatus of claim 8, further comprising:
    a noncondensed sludge discharge valve for removing said noncondensed sludge from said sludge tank to expose said first condensed sludge to air to allow formation of said second condensed sludge which is more condensed than said first condensed sludge.

11. The apparatus of claim 8 wherein the flow regulating means comprises:
    one or more press means to compact said first condensed sludge formed on said filter plates to form said second sludge which is more condensed than said first condensed sludge; and
    means for driving said press means toward or further away from said one or more filter plates.

12. The apparatus of claim 8 wherein the flow regulating means comprises one or more rubber diaphragms within said sludge tank which, when inflated, compact said first condensed sludge to form said second sludge which is more condensed than said first condensed sludge.

13. The apparatus of claim 8 wherein the flow regulating means comprises:

one or more parallel plates;

means for lowering said one or more parallel plates for compacting said first condensed sludge on said one or more filter plates to form said second sludge which is more condensed than said first condensed sludge.

14. The apparatus of claim 13 wherein said lowering means comprises:

an air cylinder disposed outside said tank; and a supporting plate disposed between said one or more parallel plates and said exterior air cylinder, wherein said supporting plate in substantially perpendicular to said parallel plates;

wherein said exterior air cylinder operates to move said parallel plates into contact with said first condensed sludge.

15. The apparatus of claim 8 wherein the flow regulating means comprises means for compressing said one or more filter plates toward one another, whereby said first condensed sludge is compacted to form said second sludge which is more condensed than said first condensed sludge.

* * * * *

UNITED STATES PATENT AND TRADEMARK OFFICE
CERTIFICATE OF CORRECTION

PATENT NO. : 5,441,651
DATED : August 15, 1995
INVENTOR(S) : Yamaguchi et al.

It is certified that error appears in the above-indentified patent and that said Letters Patent is hereby corrected as shown below:

Column 2, line 64, "FIG. 10 ..." should start a new paragraph;

Column 2, line 66, "FIG. 11 ..." should start a new paragraph;

Column 2, line 68, "FIG. 12 ..." should start a new paragraph;

Column 6, line 52, "2" should read --24--;

Column 6, line 53, "24" should read --2--;

Column 6, line 54, "24" should read --2--;

Column 7, line 47, "at least one" should read --one or more--.

Signed and Sealed this

Thirtieth Day of April, 1996

Attest:

BRUCE LEHMAN

Attesting Officer    Commissioner of Patents and Trademarks